United States Patent [19]

Ceravolo

[11] Patent Number: 5,456,163
[45] Date of Patent: Oct. 10, 1995

[54] JUICE AND GRAVY DRIPPINGS COLLECTOR SYSTEM FOR BARBECUE GRILLS

[76] Inventor: Frank J. Ceravolo, 2877 NE. 29th St., Ft. Lauderdale, Fla. 33306

[21] Appl. No.: 231,801

[22] Filed: Apr. 25, 1994

[51] Int. Cl.⁶ ........................................................ F24B 3/00
[52] U.S. Cl. ........................ 99/446; 99/393; 99/425; 99/444; 99/450; 126/25 R; 126/25 AA
[58] Field of Search .............................. 99/446, 385, 393, 99/400, 425, 444, 450; 126/25 R, 25 AA

[56] References Cited

U.S. PATENT DOCUMENTS

| | | | |
|---|---|---|---|
| 2,542,406 | 2/1951 | Flajole | 99/393 |
| 3,976,000 | 8/1976 | Oxel | 99/393 |
| 4,773,319 | 9/1988 | Holland | 99/446 |
| 4,862,792 | 9/1989 | Lerma, Jr. | 99/393 |
| 4,862,795 | 9/1989 | Hawkins | 99/446 |
| 4,909,137 | 3/1990 | Brugnoli | 99/446 |
| 4,932,390 | 6/1990 | Ceravolo | 126/25 AA |
| 5,099,821 | 3/1992 | Ceravolo | 126/25 R |
| 5,313,877 | 5/1994 | Holland | 99/446 |

Primary Examiner—David A. Scherbel
Assistant Examiner—Patrick F. Brinson
Attorney, Agent, or Firm—Oltman and Flynn

[57] ABSTRACT

System for draining and collecting of the gravy and juices produced by a barbecue grill. The system can incorporate an inclined surface to drain gravy and juices to a container located exterior to the grill. Alternatively the system can utilize a separate chamber within the grill for collecting the gravy and juices. The system can incorporate a free-spinning half grid for enhancing even cooking. The system can be used with various types of heating sources including charcoal, gas and electric. By using an electric heat source, the gravy and juice can be further drained through the electric heat source to a collector.

14 Claims, 2 Drawing Sheets

JUICE AND GRAVY DRIPPINGS COLLECTOR SYSTEM FOR BARBECUE GRILLS

The invention relates generally to the field of barbecue grills, and in particular to systems for the draining and collecting of juices and gravy produced by a barbecue grill.

BACKGROUND AND PRIOR ART

Barbecue grills have been used for hundreds of years. See for example U.S. Pat. No. 4,932,390 and 5,099,821 issued to the applicant which are incorporated by reference. A variety of heating sources including charcoal, gas and electric have been widely used in the past for these grills. The grills have generally encompassed placing single grids completely above the entire heating source. However, a problem exists wherein the drippings (i.e. gravy and juices) produced by these barbecue grills is wasted and lost by passing through the grill directly onto the heating source. It is well known that cooking is enhanced by constantly taking the drippings comprising the juices and gravy produced during the cooking process to make gravy or Au Jus.

A secondary problem with existing systems occurs that causes uneven cooking and excessive charring. As the surface of cooking foods is being roasted and burned, the insides can still be raw. In order to adequately cook the insides, the exterior would have to be overcooked which has been known to releasing harmful toxins. A third problem occurs in existing systems when the drippings, gravy and juices produced flare up and start a fire upon contact with the heating element. Present barbecue grills do not avoid these problems.

SUMMARY OF THE INVENTION

It is accordingly an object of the instant invention to provide a system for the drainage and collection of the juices and gravy produced from barbecue grills.

In accordance with the primary object there is provided a drippings collector located on one side of the grid support post within a barbecue grill. The other side of the grill can contain the normal heating sources used in cooking. The collector can serve as a reservoir for containing the drippings produced in the cooking process.

A second embodiment can include an inclined surface within the drippings collector of the first embodiment. The inclined surface can drain the drippings toward a container located exterior to the grill. Optionally the collector can include a shut-off valve to control the flow of the drippings.

A third embodiment can include a collector encompassing the entire base portion of a barbecue grill located beneath an electric heating source. Drippings can drain through the the electric heating source.

The three embodiments can include a free-spinning half-grid for allowing for both direct and indirect cooking.

Accordingly an object of the invention is to save the drippings, juices and gravy produced by the ordinary cooking process in a barbecue grill.

Another object of the invention is to allow for a free-spinning half-grid that can be rotated back and forth for a combination of direct and indirect cooking which causes both the inside and outside of the food to be evenly cooked.

Another object of the invention is to reduce the harmful toxins released during the cooking process.

Another object of the invention is to reduce the chances of a fire in existing grills caused by gravy and juices contacting the heating element.

Accordingly this invention can be part of newly produced barbecue grills or incorporated into existing barbecue grills.

Further objects and advantages of this invention will be apparent from the following detailed description of preferred embodiments which are illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Embodiments of the invention and methods for operation are illustrated in FIGS. 1 through 6.

First Preferred Embodiment

Figure 1:
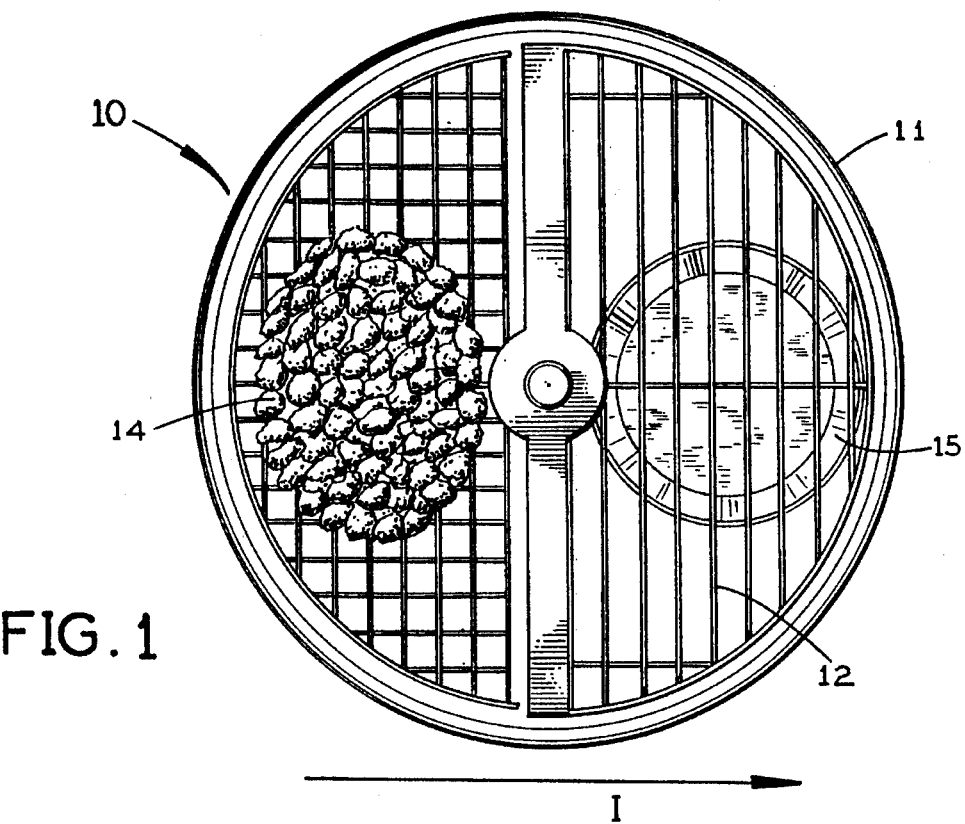
FIG. 1 is a top view of the first embodiment showing a heat source and a container for drippings within a barbecue grill.
Figure 2:
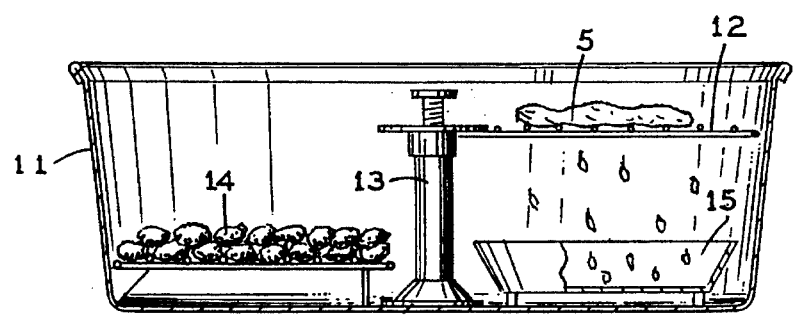
FIG. 2 is a side view along arrow I of FIG. 1.

FIG. 1 is a top view of the first embodiment 10 showing a heat source 14 and a container 15 for collecting drippings within a barbecue grill 11. Heat source 14 can encompass various types of techniques for cooking including charcoal, gas and electric elements. Barbecue grill 11 can be divided into two semicircle chambers: one chamber for supporting a heating source 14 and a second chamber for supporting a dripping s collector 15. The grill 11 further include a free spinning halfgrid 12 which can be rotated back and forth above the heating source 14 for a combination of direct and indirect cooking.

When the half-grid is over the heat source 14, cooking proceeds at a standard rate. But when the grid is rotated 180 degrees, the food 5 is not in direct contact with the heat source 14 and can be indirectly cooked, kept warm or defrosted. This free-spinning grid aids in the cooking process by all but eliminating the possibility of uneven cooking, reducing the harmful toxins released by overcooked meat and controling flare-ups while cooking. Further, combining a free-spinning grid with a charcoal heat source for example, will reduce the amount of charcoal necessary to cook the same amount of food on a standard grill. Post 13 can also include vertical height adjusters as described in applicant's U.S. Pat. Nos. 4,932,390 and 5,099,821 which are incorporated by reference.

In operation, when the grid 12 is located over the collector 15, the collector 15 can serve as a reservoir for containing the drippings from the cooking food 5. See FIG. 2. These drippings include gravy and juices produced from the cooking process which can be used and reused to make more gravy or Au Jus. Collector 15 can be a type of pan composed of aluminum or the like.

Second Preferred Embodiment

Figure 3:
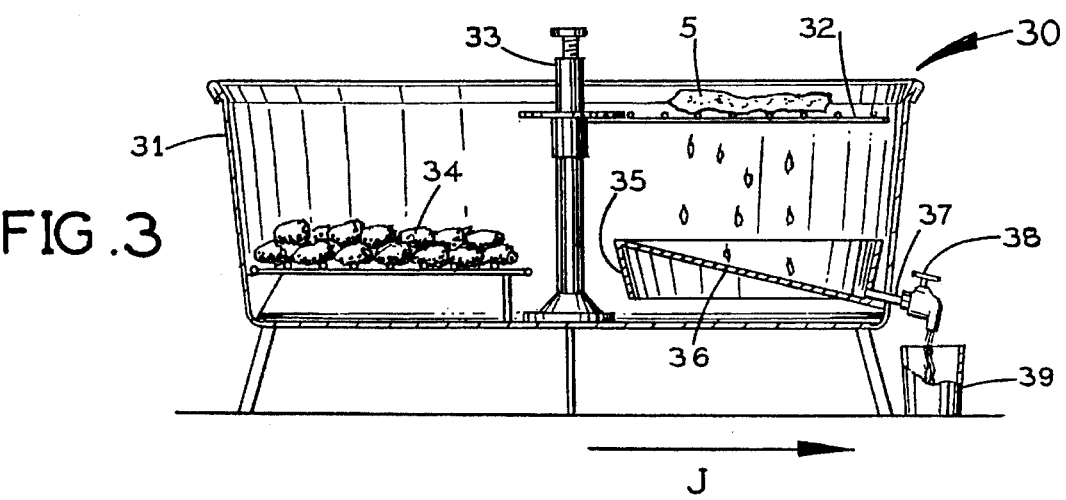
FIG. 3 is a side view of the second embodiment showing a heat source and drippings collector with inclined surface and exterior container.
Figure 4:
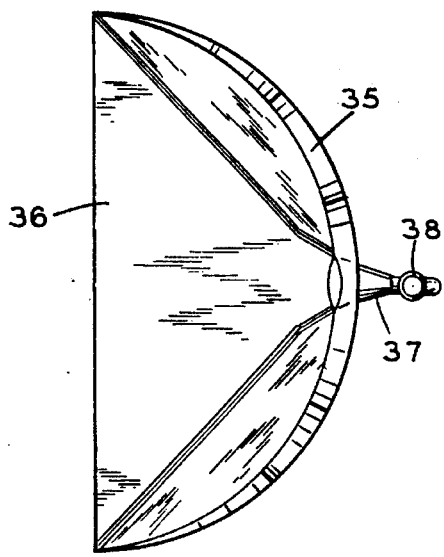
FIG. 4 is a top view along arrow J of the drippings collector shown in FIG. 3.

FIG. 3 is a side view of the second embodiment showing a heat source 34 and drippings collector 35 with inclined surface 36 and exterior container 39. The collector 35 may also include a spout 37 located exterior to the grill 31. Spout 37 can further include a valve 38 for turning on and off the flow of the drippings received by exterior container 39. The portion of the collector located within the grill has a sloping surface 36. See FIG. 4 which is a top view along arrow J of the drippings collector 35 shown in FIG. 3

In operation, when the valve 38 is in the off position, the collector 35 serves as a reservoir for containing the drippings from the cooking food 5. When the valve 38 is in an open position, the drippings flow freely down inclined surface 36 and through spout 37 and into exterior container 39. Exterior container 39 can be a measuring cup of the like. Similar to the embodiment of FIGS. 1 and 2, the system shown in FIGS. 3 and 4 can also be incorporated into existing barbecue grills. The spout 37 can protrude from an already existing air vent in a barbecue grill. Also as in FIGS. 1 and 2, grid 32 can be a free-spinning halfgrid.

Third Preferred Embodiment

Figure 5:
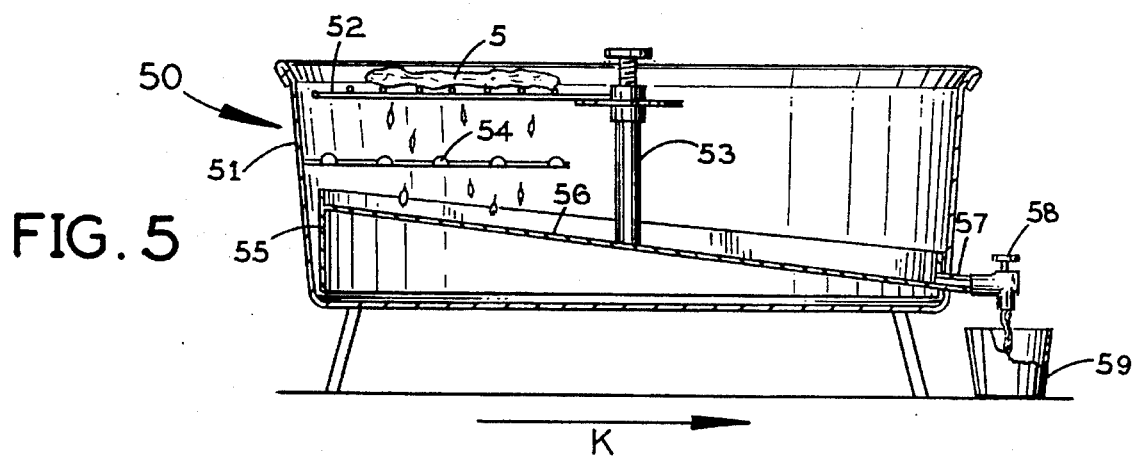
FIG. 5 is a side view of the third embodiment showing an electric heat source and fullsize drippings collector with exterior container.
Figure 6:
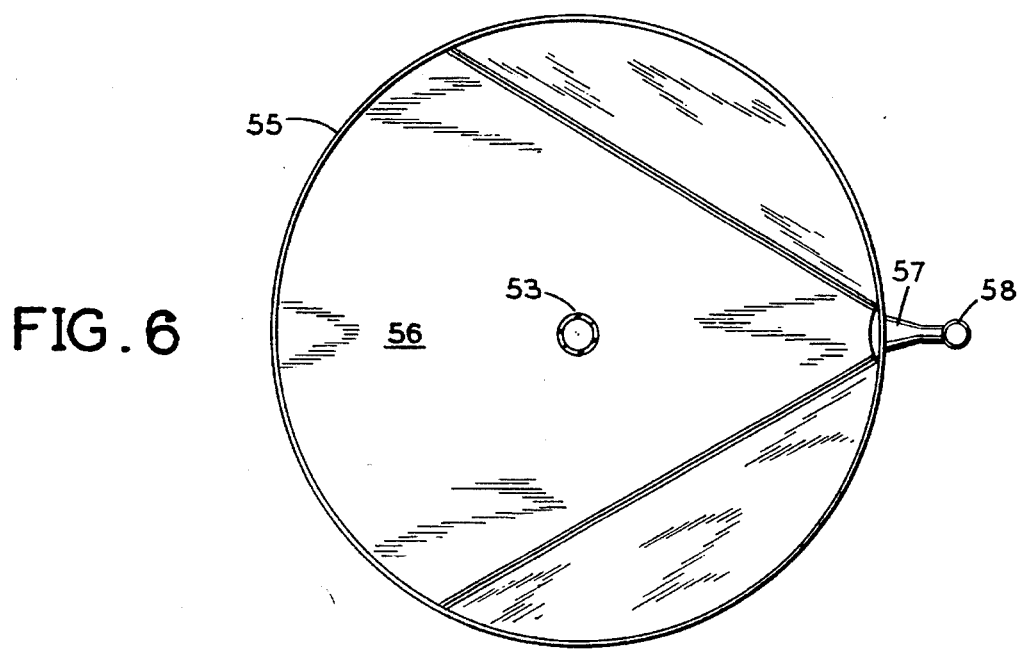
FIG. 6 is a top view along arrow K of the drippings collector shown in FIG. 5.

FIG. 5 is a side view of the third embodiment showing an electric heat source 54 and fullsize drippings collector 55 with exterior container 59. Similar to FIGS. 3 and 4, the collector 55 may also include a spout 57 located exterior to the grill 51. Spout 57 can further include a valve 58 for turning on and off the flow of the drippings received by exterior container 59. Collector 55 has a sloping surface 56 which slopes in a downward triangular direction to one side. See FIG. 6 which is a top view along arrow K of the drippings collector 55 shown in FIG. 5. Collector 55 can be inserted around center-post 53 within grill 51.

In operation, when the valve 58 is in the off position, the collector 55 serves as a reservoir for containing the drippings from the cooking food 5. When the valve 58 is in an open position, the drippings flow freely down inclined surface 56 and through spout 57 and into exterior container 59. Exterior container 39 can be a measuring cup of the like. Similar to the embodiment of FIGS. 1–4, the system shown in FIGS. 5 and 6 can also be incorporated into existing barbecue grills. The spout 57 can protrude from an already existing air vent in a barbecue grill. Like in the above embodiments, grid 52 can also be a free-spinning halfgrid.

The invention by its design provides several beneficial features. First, the free-spinning grid allows for direct and indirect cooking. Two, the system enables for even cooking of foods by reducing food charring. Third, the gravy and juice drippings normally lost with existing grills can be saved. Three, the system can reduce the chances of accidental flareup and the chances of fires caused with existing systems.

Although the embodiments mentioned above incorporate free-spinning half-grids, a standard fullsize grid can be substituted for the half-grid whenever more cooking area is desired. Further, although the preferred embodiment describes using the drainage and collector system with barbecue grills, this system would have beneficial application for use with all types of cooking grids located inside as well as outside one's home.

Based on the above disclosure, various modifications and alternative embodiments will be apparent. Accordingly, the invention is only to be limited by the claims which follow this disclosure.

I claim:

1. A gravy and juice collector system for a grill comprising:

a food support grid, the grid having a free-spinning portion that extends over half of a grill, a first chamber for supporting a heating source located beneath the grid, and a second chamber for collecting gravy and juices produced by cooking food over the grid, the second chamber being located side-by-side with the first chamber, wherein the grid is alternatively rotated between the first chamber and the second chamber.

2. The gravy and juice collector system of claim 1, wherein the heating source is chosen from at least one of charcoal, gas and electric power.

3. The gravy and juice collector system of claim 1, wherein the second chamber further includes:

an inclined surface for draining the gravy and juices to a location exterior to the second chamber.

4. The gravy and juice collector system of claim 1, wherein the grid further includes:

a post for supporting the grid above the heating source.

5. A gravy and juice drainage system for a grill, comprising:

a food support grid that rotates over a first chamber and a second chamber, the first chamber being side-by-side with the second chamber, an inclined surface located in the second chamber, so that when the grid is rotated over the second chamber the inclined surface drains the gravy and juices produced by cooking food over the grid, and a container for collecting the gravy and juices from the inclined surface.

6. The gravy and juice collector system of claim 5, wherein the grid further includes:

a heating source located in the first chamber.

7. The gravy and juice collector system of claim 6, wherein the heating source is chosen from at least one of charcoal, gas and electric power.

8. The gravy and juice collector system of claim 5, wherein the grid further includes:

a post for supporting the grid above the heating source.

9. The gravy and juice collector system of claim 5, wherein the grid further includes:

a free-spinning portion that extends over half of a grill.

10. A gravy and juice drainage system for an electric grill, comprising:

a rotatable food support grid;

a first chamber and a second chamber located side-by-side beneath the grid;

an electric heating element with an opening located in the first chamber beneath the grid for allowing gravy and juices produced by cooking food over the grid to pass through the heating element; and an inclined surface positioned beneath the heating element for draining the gravy and the juices, the inclined surface located in both the first chamber and the second chamber.

11. The gravy and juice drainage system of claim 10, further including:

a collector located adjacent to the electric heating element within the grill for receiving the gravy and juices that have passed through the electric heating element.

12. The gravy and juice drainage system of claim 10, further including:

a collector located adjacent to the electric heating element and exterior to the grill for receiving the gravy and juices that have passed through the electric heating element.

13. The gravy and juice collector system of claim 10, wherein the grid further includes:

a post for supporting the grid above the heating source.

14. The gravy and juice collector system of claim 10, wherein the grid further includes:

a free-spinning portion that extends over half of a grill.

* * * * *